(No Model.)
J. W. RIGLANDER.
EYEGLASSES.
No. 323,736. Patented Aug. 4, 1885.
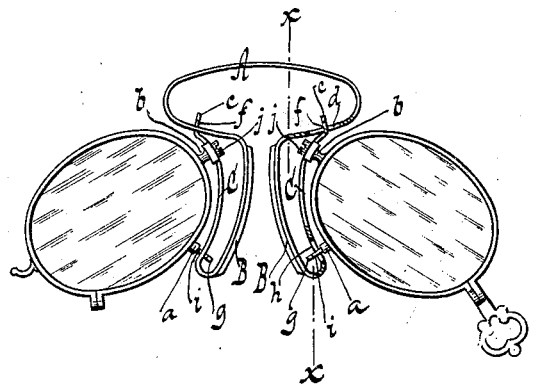
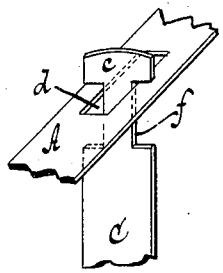
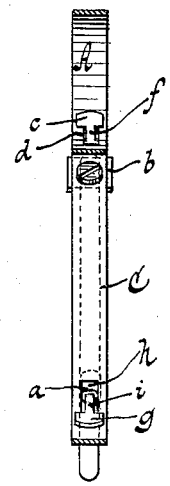
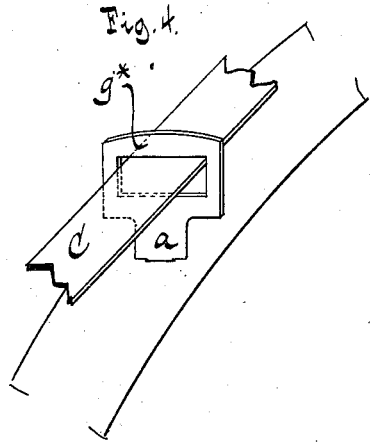
WITNESSES:
Otto Hufeland
William Miller
INVENTOR
Jacob W. Riglander
BY Van Santvoord & Hauff
ATTORNEYS

UNITED STATES PATENT OFFICE.

JACOB W. RIGLANDER, OF NEW YORK, N. Y.

EYEGLASSES.

SPECIFICATION forming part of Letters Patent No. 323,736, dated August 4, 1885.

Application filed April 23, 1885. (No model.)

*To all whom it may concern:*

Be it known that I, JACOB W. RIGLANDER, a citizen of the United States, residing at New York, in the county and State of New York, have invented new and useful Improvements in Eyeglasses, of which the following is a specification.

This invention relates to eyeglasses in which the bridge-spring, the nose-pieces, and springs for supporting said nose-pieces are all made integral with the bridge spring. The ends of the supporting-springs can play freely in slots in the bridge-spring, and the studs which connect the supporting-springs with the eyeglasses play in slots in the supporting-springs. The ends of the studs are T-shaped, so that by turning either of the supporting-springs on its stud to the proper position said spring can be readily removed from its stud.

In the accompanying drawings, Figure 1 represents a face view of my invention. Fig. 2 is a perspective view, showing the connection of the end of one of the supporting-springs with the bridge spring, on a larger scale than the previous figure. Fig. 3 is a transverse section in the plane $x\ x$, Fig. 1. Fig. 4 shows a modification of certain parts, as hereinafter described.

Similar letters indicate corresponding parts.

In the drawings, the letter A designates the bridge-spring of a pair of eyeglasses. B B are the nose-pieces. C C are the supporting-springs, and $a\ a\ b\ b$ are the studs which form the connections of the bridge-spring and supporting-spring with the eyeglasses. In the example shown in the drawings the lenses are set into bows, and in this case the studs $a\ a\ b\ b$ are secured to the bows; but my invention is also applicable to frameless eyeglasses, and in this case said studs are directly secured to the lenses.

The bridge-spring, the nose-pieces, and the supporting-springs are all made integral, of one and the same piece, of spring-steel or other metal, and the ends $c\ c$ of the supporting-springs are made T-shaped, as shown in Figs. 2 and 3. These T-shaped ends are passed through slots $d\ d$ in the bridge-spring and then turned to the position best seen in Fig. 2. In this position the ends of the supporting-springs can play in the bridge-spring to the extent of the necks $f\ f$, formed inside of the T-heads $c\ c$. The supporting-springs are firmly secured to the studs $b\ b$ by screws $j\ j$, but their connections with the studs $a\ a$ are yielding. In the example shown in the drawings the studs $a\ a$ are provided with T-heads $g\ g$, which engage with slots $h\ h$ in the supporting-springs C C, allowing said supporting-springs to play on the studs $a\ a$ to the extent of the necks $i$, formed beneath said T-heads. By removing the screws $j\ j$, which secure the supporting-springs to the studs $b\ b$, and by turning the eyeglasses so as to bring the T-heads $g\ g$ of the studs $a\ a$ in a position parallel to the slots $h\ h$, the bridge-spring, together with the nose-pieces and the supporting-springs, can be readily removed from the eyeglasses, which is of importance in making repairs.

It is obvious that other devices might be substituted for the T-heads $g\ g$ and slots $h\ h$, for the purpose of producing a yielding connection between the supporting-springs and the studs $a\ a$. For instance, the heads of the studs $a\ a$ might be provided with openings large enough to admit the supporting-springs to pass freely through the same and to play therein within the desired limits, as shown in Fig. 4, where $a$ represents one of the studs. $g^*$ is its open head, and C is the supporting-spring passing through said open head.

By means of my invention the eyeglasses rest easy upon the nose, and they are not liable to drop, which is of great advantage for the eyes.

What I claim as new, and desire to secure by Letters Patent, is—

1. The combination, with a pair of eyeglasses having attached studs $a\ a$ and $b\ b$, of the bridge-spring A, having slots $d$, and formed integral with the nose-springs B and supporting-springs C, the latter being loosely connected with the studs $a$, and rigidly attached to the studs $b$, and having their upper ends loosely engaging the slots in the bridge-piece, substantially as described.

2. The combination, with a pair of eyeglasses having attached T-headed studs $a\ a$ and studs $b\ b$, of the bridge-spring A, having slots $d$, and formed integral with the nose-springs B and supporting-springs C, the latter being secured to the studs *b*, and having slots *h*, loosely engaging the studs *a*, and provided at their upper ends with T-heads *c*, engaging the slots in the bridge-piece, substantially as described.

3. The combination, with the bridge-spring A and the nose-pieces B B, of supporting-springs C C, having T-heads *c c*, formed to engage with slots *d d* in the bridge-spring, the studs *b b*, and screws *j j*, for connecting the supporting-springs rigidly to said studs, and the studs *a a*, formed to produce yielding connections for the supporting-springs, substantially as shown and described.

In testimony whereof I have hereunto set my hand and seal in the presence of two subscribing witnesses.

J. W. RIGLANDER. [L. S.]

Witnesses:
W. HAUFF,
E. F. KASTENHUBER.